(12) United States Patent
Loher et al.

(10) Patent No.: US 7,155,348 B2
(45) Date of Patent: Dec. 26, 2006

(54) FORCE-MEASURING CELL FOR A WEIGHING SCALE, AND WEIGHING SCALE

(75) Inventors: Urs Loher, Nänikon (CH); Jean-Maurice Tellenbach, Hettlingen (CH); Cryrill Bucher, Bassersdorf (CH)

(73) Assignee: Mettler-Toledo AG, Greifensee (CH)

( * ) Notice: Subject to any disclaimer, the term of this patent is extended or adjusted under 35 U.S.C. 154(b) by 14 days.

(21) Appl. No.: 10/943,096

(22) Filed: Sep. 17, 2004

(65) Prior Publication Data

US 2005/0081651 A1 Apr. 21, 2005

Related U.S. Application Data

(63) Continuation of application No. PCT/EP03/50050, filed on Mar. 10, 2003.

(30) Foreign Application Priority Data

Mar. 18, 2002 (EP) .................. 02100273

(51) Int. Cl.
- *G06L 1/00* (2006.01)
- *G06F 19/00* (2006.01)
- *G06G 19/40* (2006.01)

(52) U.S. Cl. ............... 702/41; 174/117 FF; 177/25.14; 177/211

(58) Field of Classification Search .................. 702/41, 702/42, 43, 56; 174/117; 177/25.14, 211; 73/862.623, 862.625, 856, 862.336
See application file for complete search history.

(56) References Cited

U.S. PATENT DOCUMENTS

| | | | |
|---|---|---|---|
| 4,796,212 A | 1/1989 | Kitagawa | |
| 4,815,547 A * | 3/1989 | Dillon et al. | ............ 177/25.14 |
| 5,756,943 A | 5/1998 | Naito et al. | |
| 5,841,077 A | 11/1998 | Kolaci | |
| 5,929,390 A * | 7/1999 | Naito et al. | ................. 177/211 |
| 6,222,131 B1 * | 4/2001 | Schilson | ................ 174/117 FF |

FOREIGN PATENT DOCUMENTS

| | | |
|---|---|---|
| DE | 296 22 189 U1 | 4/1997 |
| DE | 198 36 317 A1 | 2/2000 |
| DE | 199 10 003 A1 | 9/2000 |

(Continued)

OTHER PUBLICATIONS

U. Tietze, Ch. Schenk, Halbleiterschaltungstechnik, 11$^{th}$ edition, first reprint, Springer Verlag, Berlin 1999, pp. 1242-1243.

(Continued)

*Primary Examiner*—Bryan Bui
*Assistant Examiner*—John Le
(74) *Attorney, Agent, or Firm*—Buchanan Ingersoll & Rooney PC

(57) ABSTRACT

A force-measuring cell is disclosed which is equipped with a force transducer which includes a deformable body that is equipped with sensors. The deformable body connects a housing-mounted fixed part to a force-introducing part of the force transducer. The sensors are connected to electrical conductors of at least one flat ribbon cable which leads to a circuit module that serves to process the measuring signals and contains the connections for joining the sensors together in a measuring bridge circuit. The conductor tracks can be configured so that all of the connecting leads from nodal points of a measuring bridge to the contact terminals of the sensors have at least approximately equal resistance values.

17 Claims, 4 Drawing Sheets

FOREIGN PATENT DOCUMENTS

| | | |
|---|---|---|
| DE | 199 39 633 A1 | 2/2001 |
| EP | 0 319 176 A2 | 6/1989 |
| EP | 0 511 521 A2 | 4/1992 |
| EP | 0 670 479 A1 | 9/1995 |
| EP | 0 702 220 A2 | 3/1996 |
| EP | 1 069 418 A1 | 1/2001 |
| EP | 1 113 249 A2 | 7/2001 |
| GB | 1 462 808 | 1/1977 |

OTHER PUBLICATIONS

Al Brendel, Overload Protection In Electronic Weighing Systems: Part 5, XP-002138047, Measurement and Control, Vo. 12, No. 1979, p. 471.

Copending U.S. Appl. No. 10/943,094, and corresponding EP Search Report PCT/EP 03/50049 dated May 30, 2003 and PCT Search Report PCT/EP 03/50049 dated Dec. 22, 2003.

Copending U.S. Appl. 10/943,037 and corresponding EP Search Report PCT/EP 03/50048 dated Jul. 8, 2003.

EP Search Report PCT/EP 03/50050 dated May 21, 2003.

* cited by examiner

FORCE-MEASURING CELL FOR A WEIGHING SCALE, AND WEIGHING SCALE

CROSS REFERENCE TO RELATED APPLICATIONS

This application claims priority under 35 U.S.C. §119 to European Application No. 02100273.8 filed in the EPO on 18 Mar. 2002, and as a continuation application under 35 U.S.C. §120 to PCT/EP03/50050 filed as an International Application on 10 Mar. 2003 designating the U.S., the entire contents of which are hereby incorporated by reference in their entireties.

BACKGROUND

The invention relates to a force-measuring cell for a weighing scale, and it also relates to a weighing scale with a force-measuring cell.

Known force-measuring cells of weighing scales are equipped with a force transducer that is on one side attached to a scale housing serving as support base and on the other side to a weighing pan carrier through which the force to be measured is introduced.

As described in [1], DE 199 39 633 A1, the force transducer which is given the names "counterforce" or "force receiver" in [2], EP 0 670 479 A1, has an elastically deformable body connecting a housing-mounted fixed part of the transducer to a force-application part or, in the case of a weighing scale, to a weighing-load application part. The force transducer has transverse grooves at the transitions between the deformable body and the parts that serve to connect the force transducer to the scale housing and the weighing pan carrier. The transverse grooves serve to mechanically uncouple the deformable body in which the deformations effected by the applied forces are measured by means of sensors, preferably by means of strain gauges.

The deformable body can be configured as a parallelogram-shaped measuring element with an arrangement of guide members resembling a parallelogram (see for example [3], EP 0 511 521 A1).

The analog signal representing the measurement is generated by means of strain gauges that are connected to each other in a bridge circuit. The signal is digitized in a converter circuit and subsequently put through further processing steps. The principal structure of a bridge circuit with strain gauges is described, e.g., in [4], U. Tietze, Ch. Schenk, Halbleiterschaltungstechnik, 11$^{th}$ edition, first reprint, Springer Verlag, Berlin 1999, pages 1242–1243.

To support the further processing of the digitized measuring signal, the measuring cell described in [2] has a memory module in which compensation data are stored that are specific to the individual measuring cell and are used for the correction of the measuring signals.

As described in [5], Patent Specification GB 1 462 808, the aforementioned correction applies in particular to errors that are caused by non-linearities, hysteresis phenomena, temperature and creep effects. The compensation data for the correction are determined during production at the factory through specific test and measuring procedures and are stored in the memory module (also see [1]).

However, one way to handle the foregoing measurement anomalies is through an appropriate design of the measuring cell, so that the errors are kept as small as possible and only a small amount of compensation is required. A solution is proposed in the published patent application EP 0 702 220 A1 [6], wherein the four strain gauges of the measuring bridge circuit, adjustment resistors serving to trim the bridge, as well as temperature-dependent resistors serving to correct errors related to temperature deviations of the strain gauges and of the deformable body are integrated in a printed, circuit that is produced through a thin-film deposition process. This printed circuit is intimately joined to the deformable body over a wide area and connected by means of a flexible flat ribbon cable to a circuit arrangement that serves to process the output signal of the bridge circuit (also see [2], FIG. 2).

However, this involves the risk that the printed circuit on the deformable body may have an unfavorable effect on the measuring properties of the deformable body. Consequently, a simpler circuit configuration for the measuring cell is often preferred, where only the strain gauges are arranged on the deformable body, joined into a measuring bridge, and connected to a circuit arrangement by means of connecting leads.

SUMMARY

Exemplary embodiments described herein are directed to optimizing measuring cells of a simpler circuit configuration in regard to temperature effects, so that the amount of compensation for temperature-related deviations is reduced.

The present invention is directed to a force-measuring cell for a weighing scale with improvements, and to a weighing scale that is suitable for the installation of the force-measuring cell.

In regard to the force-measuring cell, the aim is directed in particular at finding a way to avoid unwanted effects on the measuring behavior of the force transducer and the measuring bridge circuit.

A way to ensure that the measuring cell will function at an undiminished performance level even over an extended period of operation is also disclosed.

The force-measuring cell can be of a simple and cost-effective design and it can be inexpensive to service.

An exemplary force-measuring cell has a force transducer in which a deformable body equipped with sensors forms the connection between a fixed, housing-mounted part and a force-introducing part of the force transducer. The sensors are connected to the conductive tracks of at least one flat ribbon cable leading to a circuit module that serves to process the measuring signals and also contains the connections through which the sensors are joined into a measuring bridge circuit. The conductive tracks can be designed so that all of the connecting leads that are thereby established from the nodal points of the measuring bridge to the contact terminals of the sensors have approximately equal resistance values.

This is achieved by designing the conductor tracks that lead to the more distant sensors with an enlarged conductive cross-section over at least a part of their lengths. This can be realized in a particularly simple way in flat ribbon cables using a flexible band or foil as a substrate on which the conductor tracks are printed in the appropriate dimensions. The term "flat ribbon cable" as used hereinafter means any kind of ribbon-like flexible electrical connection with at least one conducting lead, in particular a connecting element with conductor tracks applied to a substrate material.

The connecting leads from the circuit module to the contact terminals of the sensors can furthermore include partial sections that have different dimensions, and/or a connecting lead can be used as a shared connection by at least two sensors.

A particularly simple and precisely tailored connection of the sensors can be achieved with two flat ribbon cables, where one cable connects the sensors on the top surface of the deformable body to the circuit module and the other cable connects the sensors on the bottom surface of the deformable body to the circuit module.

In addition, the flat ribbon cables can have additional conductor tracks through which for example a temperature sensor that is installed on the deformable body can be connected to the circuit module.

It has been observed that in force-measuring cells in which high-resistance strain gauges are connected to a flat ribbon cable, there can be instabilities and slowly increasing deviations of the measuring results.

The foregoing problems can be avoided by, for example, using flat ribbon cables that have a cutout at the ends where the sensors are connected. The cutout is shaped and arranged so that the area between the contact terminals of the sensors remains freely accessible after the flat ribbon cable has been connected to the sensor. Thus, if any flux residues or other contaminations are left between the sensor terminals after soldering, it can be easy to remove the residues and thereby prevent the problem of leakage currents that could occur as a result of residual conductivity between the sensor contact terminals. Load cells described herein can have the further advantage that after an extended period of operation, it takes only a small maintenance expenditure to restore them to factory specifications. For example, a simple cleaning may be sufficient.

BRIEF DESCRIPTION OF THE DRAWINGS

In the following, exemplary embodiments of the invention will be explained in more detail with reference to drawings, wherein.

DETAILED DESCIPTION

Figure 1:
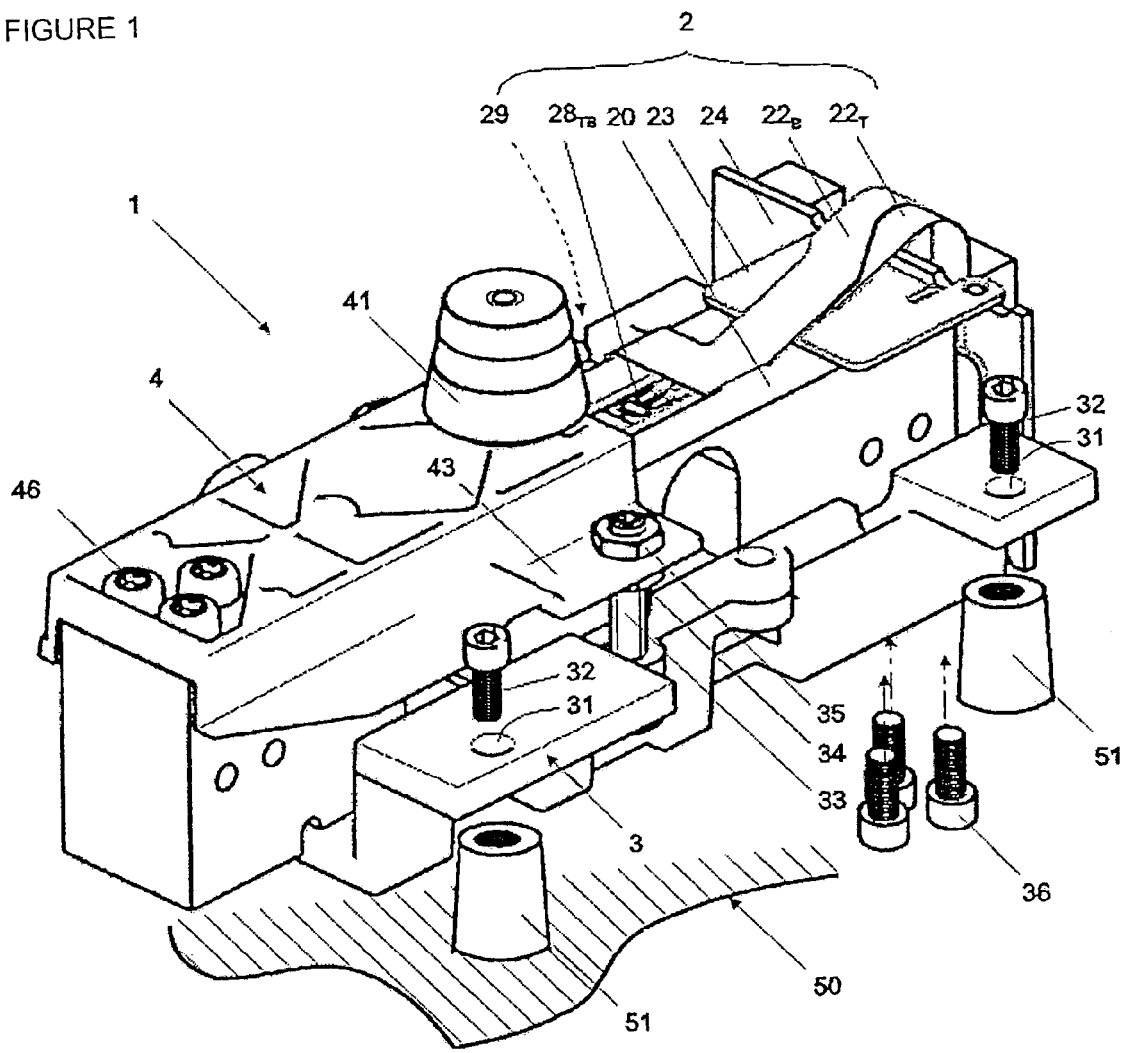
FIG. 1 illustrates a force-measuring cell 2 according to an exemplary embodiment of the invention, which is bolted together with a weighing pan carrier 4 and a fastening part 3 and which includes a force transducer 20 equipped with sensors 28, 29 and of a circuit module 25.
Figure 2:
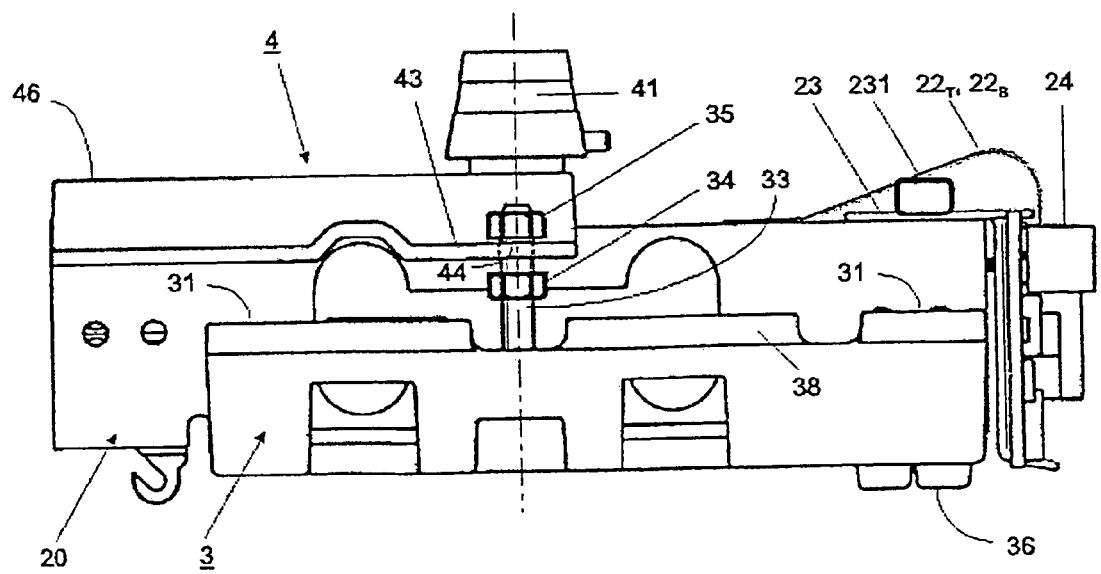
FIG. 2 represents a side view of the exemplary modular force-measuring cell 2 of FIG. 1.

FIGS. 1 and 2 illustrate a modular force-measuring cell 2 according to an exemplary embodiment of the invention, which is connected to a weighing pan carrier 4 and a fasting part 3 by means of screws 36, 46 and which includes a force transducer 20 equipped with strain gauges $28_{TF}$, $28_{TB}$, $28_{BF}$, $28_{BB}$ and a temperature sensor 29: The force-measuring cell further includes a circuit module 24.

Figure 4:
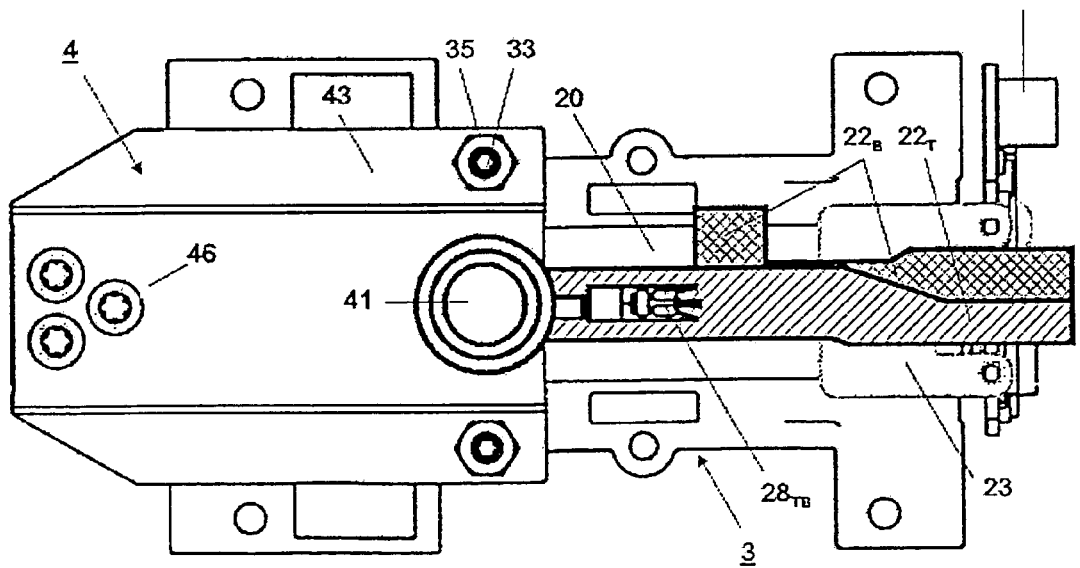
FIG. 4 represents the exemplary force-measuring cell 2 as seen from above, with two flat ribbon cables $22_T$, $22_B$ that provide the connection between the circuit module 24 and the sensors 28, 29.

As shown in FIG. 4, the strain gauges $28_{TF}$, $28_{TB}$, $28_{BF}$, $28_{BB}$ are connected by means of two separate flexible ribbon cables $22_T$, $22_B$ to the circuit module 24, where the strain gauges are joined into a measuring bridge circuit as described in [4], pages 1242–1243.

The circuit module 24, which is mechanically and thermally coupled to the force transducer by means of an angle-shaped metallic element 23, includes a memory module 245 (see FIG. 5) serving to store compensation data, and it also includes at least one circuit arrangement 243, 244 for the conversion of analog measuring signals.

The force-measuring cell 2, which is illustrated in an exemplary realization, can therefore be installed as a module in a weighing scale. Also, it is a simple and inexpensive procedure to exchange the force-measuring cell 2, if necessary.

Figure 3:
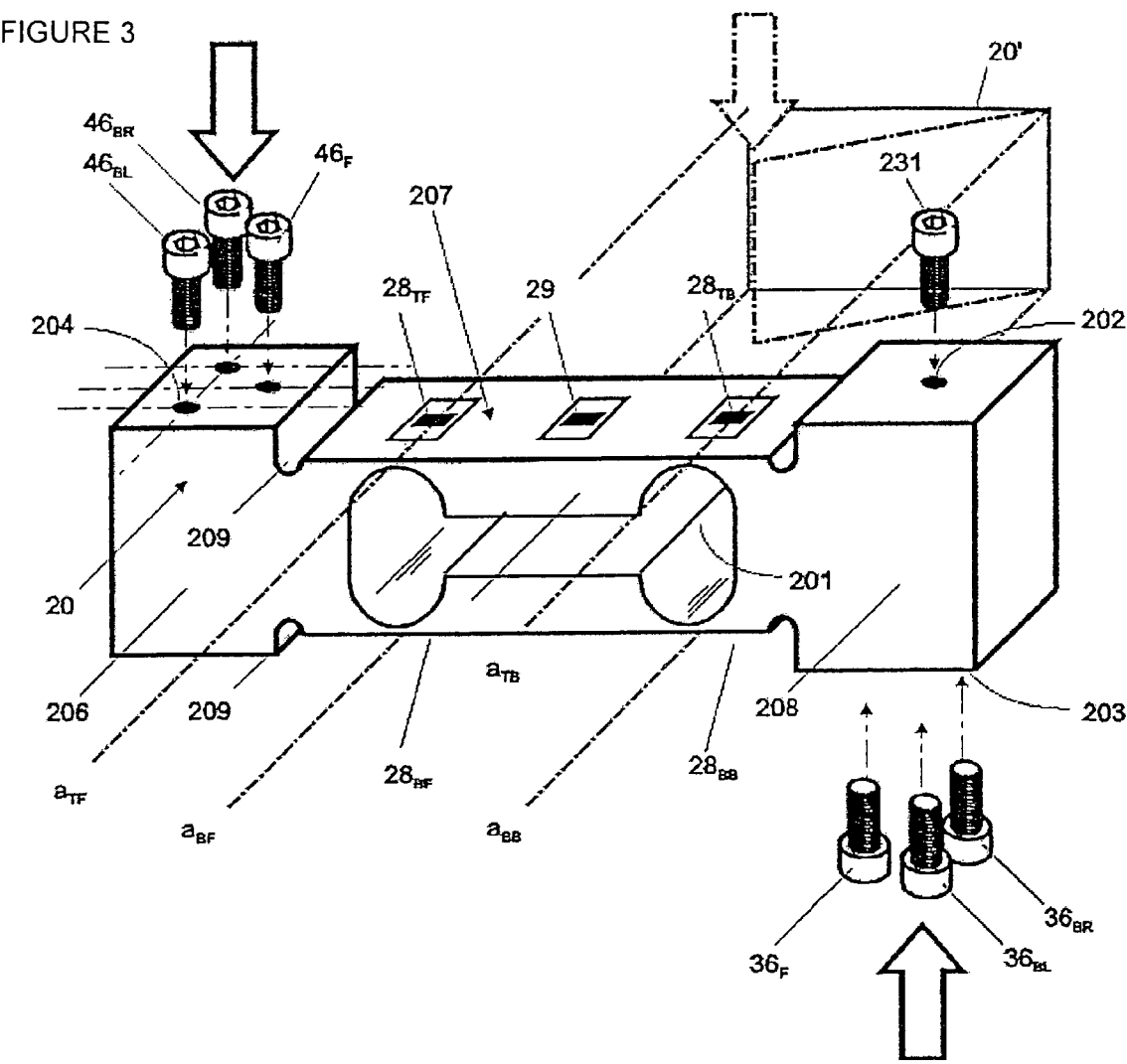
FIG. 3 represents an exemplary force transducer 20 of the modular force-measuring cell 2 of FIG. 1 with screws 36, 46, 231 that serve, respectively, to attach the fastening part 3 which establishes the connection to a scale housing 5, to attach the weighing pan carrier 4, and to attach a metal element 23 which serves to hold the circuit module 24 in place.

The force transducer 20 that is shown in an exemplary embodiment in FIG. 3 has a deformable body 207 designed as a parallelogram-shaped measuring element (see FIG. 3, element 20'). The deformable body 207 connects a housing-mounted fixed part 208 of the force transducer 207 to the force-introduction part, in this case the load-receiving part 206. To uncouple the stress field of the deformable body 207, the force transducer has transverse grooves 209 at the borders to the parts 208 and 206 that serve for the connection to the fastening part 3 and the weighing pan carrier 4. At the corners of the virtual parallelogram linkage formed by the measuring element, the deformable body 207 has thin material portions where the strain gauges $28_{TF}$, $28_{TB}$, $28_{BF}$, $28_{BB}$ are installed. The locations of maximum bending deformation at the thin material portions are indicated by the bending axes $a_{TF}$, $a_{TB}$, $a_{BF}$, $a_{BB}$ that extend perpendicular to the plane of the parallelogram.

In addition, a temperature sensor 29 that is used for temperature compensation is arranged at the midpoint of the top surface of the deformable body 207. As the illustrated arrangement is characterized by a temperature gradient in the longitudinal direction, the temperature measured by the sensor 29 represents an average value of the temperatures occurring within the deformable body 207. Based on this average value, the measurement deviations caused by temperature changes can be corrected more precisely.

Figure 5:
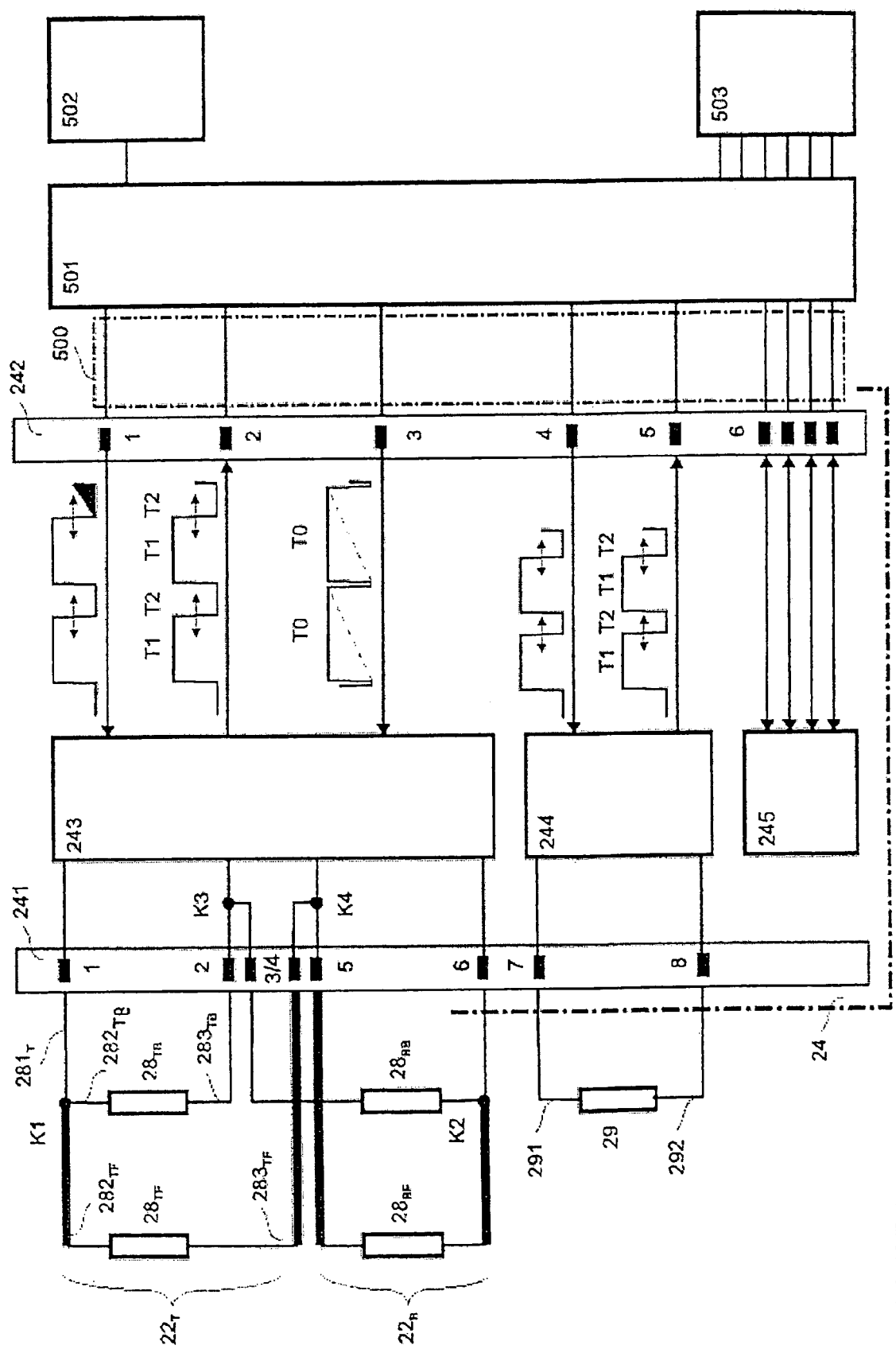
FIG. 5 illustrates the modular configuration of an exemplary circuit module 24 which communicates with the sensors 28, 29 through the ribbon connectors $22_T$, $22_T'$, $22_B$ and with a processor module 501 though the further connecting element 500.

FIG. 5 represents an exemplary embodiment of the modular structure of a circuit module 24 that is connected to the strain gauges $28_{TF}$, $28_{TB}$, $28_{BF}$, $28_{BB}$ and a temperature sensor 29 through the terminal strip 241 and ribbon connectors $22_T$, $22_T'$, $22_B$ and to a processor module 501 through the terminal strip 242 and a further ribbon connector 500. The processor module, in turn, is connected to a display 502 and an interface module 503. The processor module 501 is arranged inside the scale with a separation from the circuit module 24, so as to avoid thermal coupling between the two modules. Thus, in an exemplary embodiment, the heat generated by the processor module 501 has no influence on the modular force-measuring cell 2.

The circuit module 24 includes two converter circuits 243, 244. The first converter circuit 243 converts the analog signals of the strain gauge bridge circuit $28_{TF}$, $28_{TB}$, $28_{BF}$, $28_{BB}$ into bi-level, pulse-width modulated signals pwm1, while the second converter circuit 244 converts the analog signals of the temperature sensor 29 into bi-level, pulse-width modulated signals pwm2. The signals pwm1, pwm2 are sent through the ribbon connector 500 to the processor module 501, where the signals are further processed. After switching the scale on, the pertinent compensation data can be recalled from the memory module 245, so that subsequent measurement deviations can be corrected.

As described in [4], pages 1243–1250, and also in [6], sensors can have temperature coefficients that are detrimental to their measurement function, so that a temperature compensation can be required. In the development of the force-measuring cell 2 shown in FIG. 1 it was found, however, that at a high level of measuring resolution the temperature coefficients of the sensors themselves are not necessarily the only factor to be considered, but that the temperature coefficients of the connecting leads that join the sensors into a measuring bridge circuit also have a significant influence. A solution was found, whereby the measurement deviations caused by the connecting leads can be practically avoided.

An exemplary solution is to use specifically calculated dimensions for the conductor tracks 281, 282, 283 of the flat ribbon cable(s) $22_T$, $22_B$ connecting the sensors $28_{TF}$, $28_{TB}$, $28_{BF}$, $28_{BB}$ to the circuit module 24 where the sensors are joined into a measuring bridge circuit, so that all of the connecting leads from the nodal points of the measuring bridge circuit to the terminals 280 of the sensors $28_{TF}$, $28_{TB}$, $28_{BF}$, $28_{BB}$ have at least approximately equal resistance values. Under the condition that all of the conductor tracks 281, 282, 283 are subject to the same amounts of temperature change, the resultant resistance changes in the measuring bridge circuit will therefore cancel each other.

Therefore, the conductor tracks 281, 282, 283 that form the connecting leads of the measuring bridge circuit can be thermally coupled to the force transducer 20, so that the electrical resistance will change equally in the conductor tracks 281, 282, 283 when a temperature change occurs. As an exemplary solution to achieve the thermal coupling, the flat ribbon cables $22_T$, $22_B$ are bonded to the force transducer 20 by means of an adhesive.

Due to the modular structure of the force-measuring cell 2 where the circuit module 24 is thermally coupled to the force transducer 20, it is possible to achieve excellent results. Of course, exemplary embodiments of the invention can also be advantageously applied to non-modular force-measuring cells in which no electronic measuring circuit is integrated.

There are several different possible measures for achieving equal resistance values in the connecting leads of the measuring bridge circuit. As an exemplary concept, those of the conductor tracks 282, 283 that lead to the more distant sensors $28_{TF}$, $28_{BF}$ are given an enlarged conductive cross-section at least over a part of their lengths. Other ways of equalizing the resistance values, such as using leads or wires of equal length regardless of the difference in the distance, or matching the lengths by using meandering patterns, are familiar to those skilled in the art.

As a particularly simple and precise solution, the sensors $28_{TF}$, $28_{TB}$, $28_{BF}$, $28_{BB}$ can be connected by means of two flat ribbon cables $22_T$, $22_B$, where the cable $22_T$ connects the circuit module 24 to the sensors $28_{TF}$, $28_{TB}$ at the top of the deformable body 20 and the cable $22_B$ connects the circuit module 24 to the sensors $28_{BF}$, $28_{BB}$ at the bottom of the deformable body 20.

Furthermore, the connecting leads to the terminal pads of the sensors $28_{TF}$, $28_{TB}$, $28_{BF}$, $28_{BB}$ can include partial segments $281_{TF}$, $282_{TF}$, $283_{TF}$, $281_{TB}$, $282_{TB}$, $283_{TB}$; ... where the different partial segments have different dimensions and/or are used in common by at least two of the sensors.

In the circuit arrangement shown in FIG. 5, the flat ribbon connector $22_T$ has conductor tracks $282_{TF}$, $282_{BF}$ which are connected, respectively, to the sensors $28_{TF}$, $28_{TB}$, and joined at the nodal point K1 of the measuring bridge circuit, with a single lead $281_T$ running from the nodal point K1 to the circuit module 24. An analogous arrangement is shown for the flat ribbon connector $22_B$ where two conductor tracks are connected, respectively, to the sensors $28_{BF}$, $28_{BB}$, and joined at the nodal point K2. Thus, instead of eight connections on the circuit module 24, the number of connector terminals is reduced to the six terminals 241-1, 241-2, 241-3, 241-4, 241-5, 241-6. Two pairs of conductor tracks are joined together in nodal points K3 and K4 after entering the circuit module 24 through the terminal pairs 241-2, 241-3 and 241-4, 241-5, respectively.

The flat ribbon cables can have additional conductor tracks 291, 292 (see FIG. 5), for example to connect the circuit module 24 with a temperature sensor 29 that is arranged on the deformable body 20.

It has further been found that instabilities and slowly increasing measurement deviations can occur in force-measuring cells with high-resistance strain gauges that are connected to flat ribbon cables.

Figure 6:
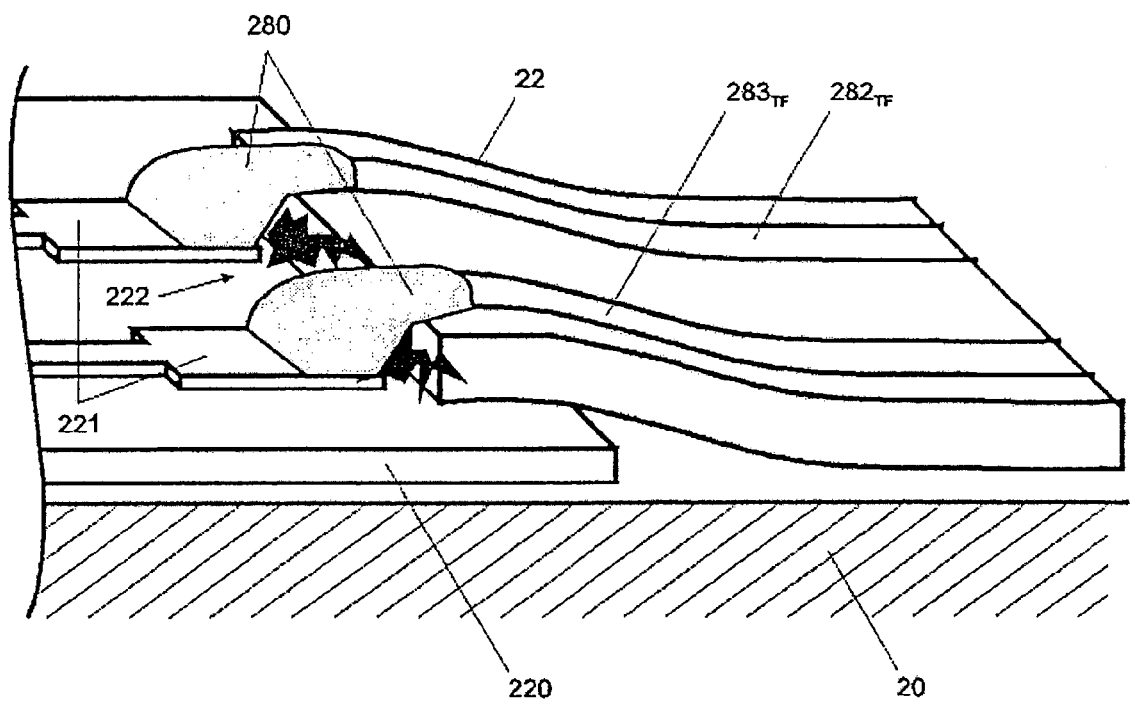
FIG. 6 illustrates a portion of an exemplary force-measuring cell where a flat ribbon cable 22 is connected to a module 220 carrying a strain gauge.

FIG. 6 shows the detail area of an exemplary force-measuring cell where the conductor tracks $282_{TF}$, $283_{TF}$ of a flat ribbon cable 22 are connected in a known manner to connector terminals 221 of a module 220 carrying a high-resistance strain gauge. As a result of the soldering process or due to other factors, accumulations of foreign matter 222 have occurred at the frontal end of the flat ribbon cable 22 adjacent to the contact terminals 221 that are connected to the conductor tracks $282_{TF}$, $283_{TF}$ by means of solder joints 280. The contaminations 222 cause a decrease in insulation resistance between the contact terminals 221. The resistance may thereby be lowered to an extent that cannot be disregarded, so that the leakage current between the contact terminals causes unacceptable measurement errors.

As is further evident from FIG. 6, it is hardly feasible to remove the contaminating matter 222 which accumulates at the frontal end of the flat ribbon cable 22.

Figure 7:
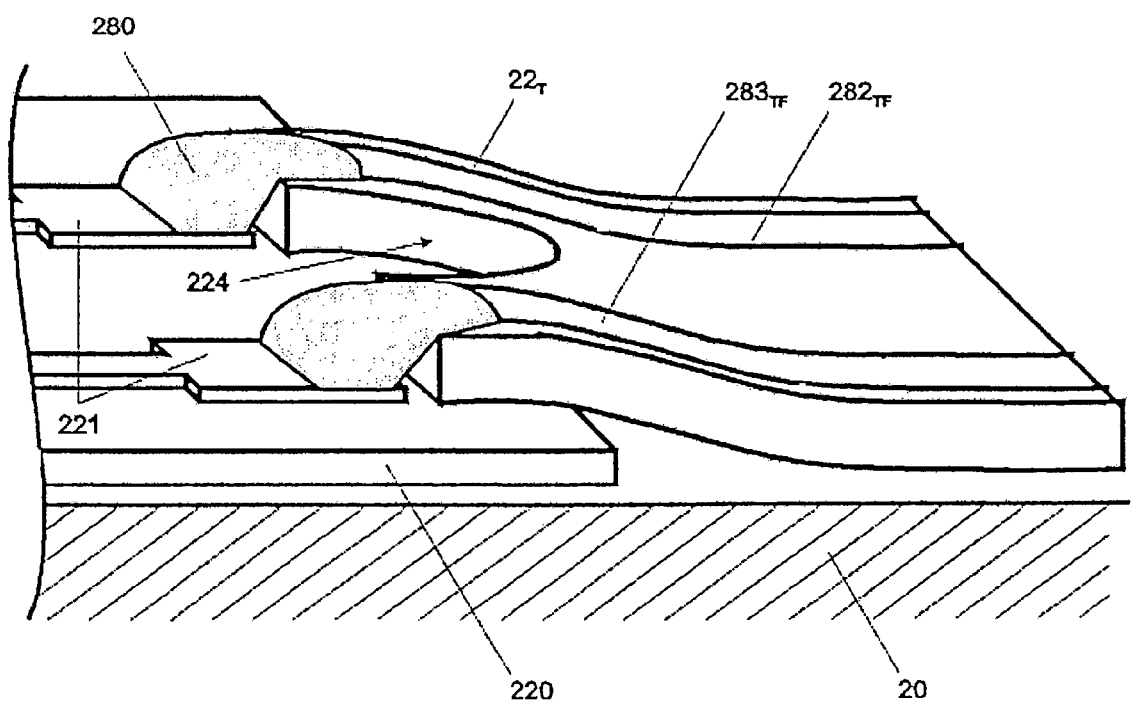
FIG. 7 shows the module of FIG. 6 to which a flat ribbon cable $22_T$ with a cutout 224 is connected in accordance with an exemplary embodiment of the invention.

FIG. 7 illustrates a flat ribbon cable 22 which is connected to the same type of module 220 as shown in FIG. 6 but includes an exemplary inventive feature of a cutout 224, so that the area between the contact terminals 221 of the module 220 is freely accessible.

In case that flux residues or other contaminations remain between the contact terminals 221 after making the solder joints 280, the contaminating matter can thus be removed without a problem, whereby the problem of a residual conductivity and associated leakage currents is avoided. An exemplary force-measuring cell 2 according to the invention has the further advantage that after an extended period of operation, it can be restored by cleaning, requiring only a modest maintenance expenditure.

The modular measuring cell 2 shown in FIG. 1 is installed in a weighing scale by means of a U-profiled fastening part 3 with wing portions 38. The housing-mounted fixed part 208 of the force transducer is connected to the fastening part 3 by means of screws 36. The wing portions 38 of the fastening part 3 have passage holes 31 for screws 32 that serve to mount the fastening part 3 on support elements 51 which are provided for this purpose in the scale housing 5 and are equipped with threaded inserts.

A weighing-pan carrier 4 with a conical seating peg 41 for the weighing pan is connected to the force-application part or load-receiving part 206 of the force transducer 20 by means of screws 46.

Further, as shown in FIG. 2, a threaded bolt 33 that is connected to the fastening part 3 passes through a hole 44 in a lateral part 43 of the weighing pan carrier 4. The bolt 33 is equipped with two threaded nuts 34, 35 which are adjustable to delimit the movement range of the weighing pan carrier 4, specifically its lateral part 43, in the up- and down directions to prevent overloading due to a pulling or pushing force on the modular measuring cell.

Exemplary inventive solutions have been described substantially by using the newly developed modular force-measuring cell of FIG. 1 as an example. However, the information presented herein will enable a person of ordinary skill in the art to apply exemplary embodiments of the invention in other measuring cells and measuring systems. The invention can also be used to particular advantage in pressure-measuring systems where strain gauges are arranged on a membrane (see [4], pages 1242, 1243). The disclosures of documents [1]–[6] referenced herein, are hereby incorporated by reference in their entireties.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A force-measuring cell with a force transducer comprising:
    a deformable body that is equipped with sensors, said deformable body connecting a housing-mounted fixed part of the force transducer with a force-introducing part of the force transducer, wherein the sensors are connected to electrical conductors; and
    a circuit module to process measuring signals and coupled to the force transducer but set apart from the deformable body, connectors for joining the sensors together in a measuring bridge circuit being arranged on the circuit module, and the electrical conductors being configured so that all connector leads that extend from nodal points of the measuring bridge circuit to connector terminals of the sensors have at least approximately equal resistance values,
    wherein the electrical conductors are routed through at least one flat ribbon cable having a flexible ribbon or foil on which tracks of the electrical conductors are printed, and
    wherein the flat ribbon cables have a cutout arranged at their ends, said cutout being configured in such a manner that an area between the contact terminals of the sensors is freely accessible.

2. The force-measuring cell according to claim 1, wherein conductors that lead to more distant sensors have an enlarged conductive cross-section at least over segments of their lengths.

3. The force-measuring cell according to claim 2, wherein the electrical conductors are thermally coupled to the force transducer, wherein the coupling is achieved by means of an adhesive.

4. The force-measuring cell according to claim 3, wherein the connecting leads to the terminals of the sensors have partial segments, and individual ones of said partial segments are configured for use in common for at least two of the sensors.

5. The force-measuring cell according to claim 4, comprising:
    at least one flexible ribbon which contains a nodal point of the measuring bridge circuit where tracks of the electrical conductors from two different sensors are joined together in a single conductor track leading to the circuit module.

6. The force-measuring cell according to claim 5, wherein at least one of the sensors is arranged on a first side of the deformable body and is connected to a first flat ribbon cable, and at least one other of the sensors is arranged on a second side of the deformable body and is connected to a second flat ribbon cable.

7. The force-measuring cell according to claim 6, wherein a sensor that is configured as a temperature sensor is arranged on the deformable body and is connected to a track of one of the first and second flat ribbon cables.

8. The force-measuring cell according to claim 3, wherein the force transducer is mechanically and thermally coupled to the circuit module, the circuit module is connected to the sensors by means of the least one flat ribbon cable, and the circuit module comprises a memory module for compensation data as well as a converter circuit for converting analog signals delivered by the sensors.

9. A weighing scale in combination with a force-measuring cell according to claim 8.

10. The force-measuring cell according to claim 1, wherein the electrical conductors are thermally coupled to the force transducer, wherein the coupling is achieved by means of an adhesive.

11. The force-measuring cell according to claim 1, wherein the connecting leads to the terminals of the sensors have partial segments, and individual ones of said partial segments are configured for use in common for at least two of the sensors.

12. The force-measuring cell according to claim 1, comprising:
    at least one flexible ribbon which contains a nodal point of the measuring bridge circuit where tracks of the electrical conductors from two different sensors are joined together in a single conductor track leading to the circuit module.

13. The force-measuring cell according to claim 1, wherein at least one of the sensors is arranged on a first side of the deformable body and is connected to a first flat ribbon cable, and at least one other of the sensors is arranged on a second side of the deformable body and is connected to a second flat ribbon cable.

14. The force-measuring cell according to claim 1, wherein a sensor that is configured as a temperature sensor is arranged on the deformable body and is connected to a track of one of the first and second flat ribbon cables.

15. The force-measuring cell according to claim 1, wherein the force transducer is mechanically and thermally coupled to the circuit module, the circuit module is connected to the sensors by means of the least one flat ribbon cable, and the circuit module comprises a memory module for compensation data as well as a converter circuit for converting analog signals delivered by the sensors.

16. A weighing scale in combination with a force-measuring cell according to claim 1.

17. The force-measuring cell of claim 1, wherein the sensors are strain gauges.

* * * * *

UNITED STATES PATENT AND TRADEMARK OFFICE
CERTIFICATE OF CORRECTION

PATENT NO.       : 7,155,348 B2                                      Page 1 of 1
APPLICATION NO.  : 10/943096
DATED            : December 26, 2006
INVENTOR(S)      : Urs Loher et al.

It is certified that error appears in the above-identified patent and that said Letters Patent is hereby corrected as shown below:

Title Page
Item (75) Inventors: Change "Cryrill" to --Cyrill--.

Signed and Sealed this

Seventeenth Day of July, 2007

JON W. DUDAS
*Director of the United States Patent and Trademark Office*